Patented Dec. 7, 1937

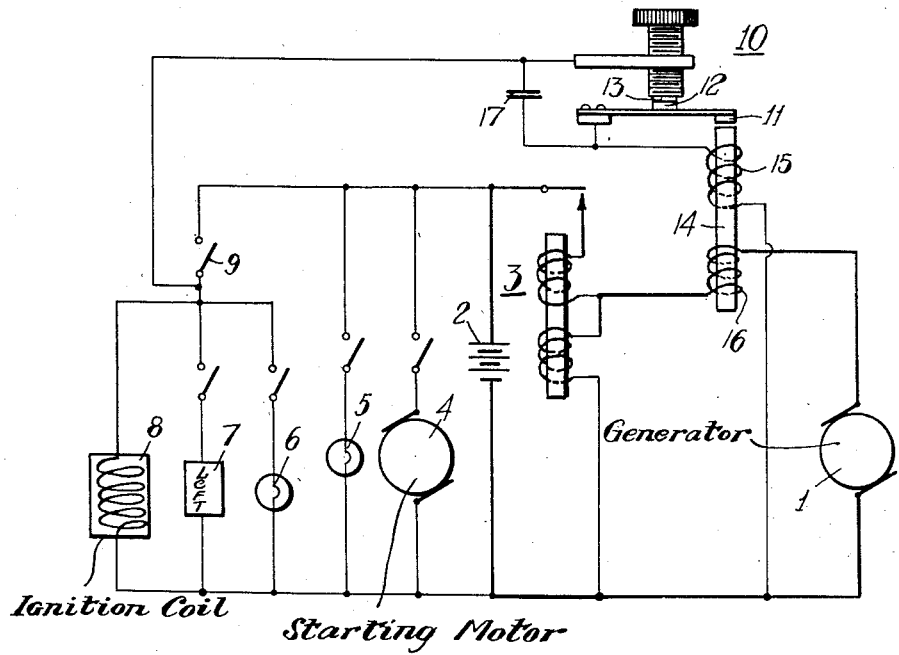

2,101,407

UNITED STATES PATENT OFFICE 2,101,407

ALARM DEVICE FOR MOTOR VEHICLES

Johan Birger Morland, Langed, Nordmaling, Sweden

Application October 7, 1935, Serial No. 43,967
In Sweden October 30, 1934

1 Claim. (Cl. 177—311)

The present invention relates to an alarm contrivance in electric installations on motor vehicles, such as motor cars and motor cycles, said contrivance having for its object to give a signal when the ignition coil or other source of current is in circuit when the motor is standing still, in order to prevent the storage battery from being discharged unnecessarily, or the ignition coil from being overheated through an extended continuous supply of current.

According to the invention, the alarm contrivance consists of an electric sound signalling device contained in a battery circuit which is controlled by a switch operated in the closing and the breaking of the current to one or more consumption apparatus, particularly to the ignition coil, the sound signalling device being also controlled by current delivered from the generator.

Further characteristics of the invention will appear from the following description of a circuit diagram shown in the accompanying drawing relative to one embodiment of the arrangement according to the invention as applied to the electric installation of a motor car.

In the drawing, 1 designates the generator, 2 the storage battery in end shunt thereto, and 3 the automatic charging relay which closes the charging circuit only when the generator delivers a sufficiently high tension. To the left of the storage battery 2, various consumption apparatus with switches pertaining thereto are connected to the terminals of the storage battery, these being a starting motor 4, a parking light 5, a main search light 6, a direction indicator 7 and an ignition coil 8. Those current consumers, in this case 6 and 7, which in addition to the ignition coil it is desired to have disconnected when the motor is standing still, are connected in the manner shown, so that they will be controlled by the switch 9 of the ignition coil. 10 is the electric sound signalling device which consists of a self-interrupter or a so-called magnetic hammer break, which is preferably devised as a buzzer and comprises a resilient trembler arm 11 with a contact 12, an adjustable contact 13 and an iron core 14 with two windings 15 and 16. The winding 15 in series with the contacts of the buzzer is connected into the battery circuit extending over the switch 9. A condenser 17 is in shunt with the contacts 12, 13 to damp the sparking. The other winding 16 on the iron core of the buzzer is connected in series in the charging circuit from the generator to the storage battery and thus has the whole charging current flowing therethrough.

When the generator is driven at a sufficient number of revolutions so as to give a tension which is higher than that of the storage battery, the charging relay 3 is thrown in, charging current then flowing through the winding 16, whereby the contact arm, which by its resiliency tends to keep the contacts 12, 13 closed, is attracted and then kept constantly attracted. Thus no sound signal will be given as long as the generator charges the battery. When the generator is brought to a standstill or ceases for some other reason to deliver current, the charging relay is disconnected so as to break the current through the winding 16, the trembler arm 11 being then pressed upwardly by its resiliency so as to close the current to the winding 15 at the contacts 12, 13, whereupon the trembler arm is in known manner caused to vibrate so as to emit buzzing sound. The contact 9 for the ignition coil is then taken to be closed. If the motor is standing still, the buzzer tone thus will call the attention to the fact that the ignition coil is still in circuit. By opening the switch 9 the current will be broken to the ignition coil as well as to the buzzer 10.

The buzzer also serves as a protector for the generator, inasmuch as it commences to operate should the generator cease to charge while rotating at a sufficiently high number of revolutions. For example, if an interruption occurs in the connection between the generator and the storage battery, which involves the risk of the generator being burned out, the buzzer by a signal indicates that something is out of order.

The buzzer need not be controlled exactly by the switch 9, but may be controlled by other switch contacts which are positively operated simultaneously with the switch 9.

What I claim is:—

An electric installation for a motor vehicle, said installation comprising a storage battery, a generator for charging said battery and a cut-out relay, contacts for said relay, at least one load connected across said battery, a switch placing said load into or out of circuit and an alarm comprising a control coil connected in series with said battery and said generator and with the contacts of said cut-out relay, a circuit including said battery, said switch and an alarm operating coil, normally closed contacts opened by the energization of either coil and included in said operating coil circuit, the arrangement being such that when said switch is closed, said device is opertaive or inoperative according to whether the current in said cut-out relay is less or greater respectively than a predetermined value and that, when said switch is open, said device is inoperative.

JOHAN BIRGER MORLAND.